(12) United States Patent
Chen et al.

(10) Patent No.: US 11,330,543 B2
(45) Date of Patent: May 10, 2022

(54) SIGNAL SENDING METHOD, SIGNAL RECEIVING METHOD, AND APPARATUS

(71) Applicant: HUAWEI TECHNOLOGIES CO., LTD., Guangdong (CN)

(72) Inventors: Zhe Chen, Shenzhen (CN); Zhe Jin, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 69 days.

(21) Appl. No.: 16/785,093

(22) Filed: Feb. 7, 2020

(65) Prior Publication Data
US 2020/0178190 A1 Jun. 4, 2020

Related U.S. Application Data

(63) Continuation of application No. PCT/CN2017/096961, filed on Aug. 10, 2017.

(51) Int. Cl.
*H04W 56/00* (2009.01)
*H04W 4/80* (2018.01)
(Continued)

(52) U.S. Cl.
CPC ......... *H04W 56/001* (2013.01); *H04J 13/004* (2013.01); *H04L 5/0092* (2013.01);
(Continued)

(58) Field of Classification Search
CPC ... H04W 56/001; H04W 4/80; H04W 72/005; H04W 72/0446; H04W 56/0015;
(Continued)

(56) References Cited

U.S. PATENT DOCUMENTS

2014/0301305 A1 10/2014 Xu et al.
2017/0251455 A1* 8/2017 Shin .................... H04L 5/00
(Continued)

FOREIGN PATENT DOCUMENTS

CN 105122715 A 12/2015
CN 106507439 A 3/2017
(Continued)

OTHER PUBLICATIONS

3GPP TSG-RAN WG1 #82bis,R1-156010,:"NB-L TE—General L 1 Concept Description",Ericsson, Alcatel-Lucent, Alcatel-Lucent Shanghai Bell,Nokia, Intel, ZTE, Samsung,Oct. 5-9, 2015,total 16 pages.
(Continued)

*Primary Examiner* — Rina C Pancholi
(74) *Attorney, Agent, or Firm* — Womble Bond Dickinson (US) LLP

(57) ABSTRACT

This application provides a signal sending method, a signal receiving method, and an apparatus. The method includes: receiving, by a terminal device on a first carrier, a narrowband primary synchronization signal (NPSS) sent by a network device according to a first period and a narrowband secondary synchronization signal (NSSS) sent by the network device according to a second period; receiving, by the terminal device on a second carrier, a narrowband physical broadcast channel (NPBCH) sent by the network device according to a third period and a system information block 1-narrowband (SIB1-NB) sent by the network device according to a fourth period; and completing, by the terminal device, downlink synchronization and obtaining system information based on the NPSS, the NSSS, the NPBCH, and the SIB1-NB.

12 Claims, 7 Drawing Sheets

(51) Int. Cl.
*H04J 13/00* (2011.01)
*H04L 5/00* (2006.01)
*H04W 72/00* (2009.01)
*H04W 72/04* (2009.01)

(52) U.S. Cl.
CPC ........... *H04W 4/80* (2018.02); *H04W 72/005* (2013.01); *H04W 72/0446* (2013.01)

(58) Field of Classification Search
CPC ..... H04W 16/02; H04W 48/10; H04J 13/004; H04L 5/0092; H04L 5/001; H04L 5/0048
See application file for complete search history.

(56) References Cited

U.S. PATENT DOCUMENTS

| | | | |
|---|---|---|---|
| 2018/0159713 A1 | 6/2018 | Li et al. | |
| 2018/0234219 A1* | 8/2018 | Sridharan | H04B 7/2656 |
| 2019/0013984 A1 | 1/2019 | Liang et al. | |
| 2019/0159179 A1* | 5/2019 | Liu | H04L 5/001 |
| 2019/0166612 A1* | 5/2019 | Yokomakura | H04W 72/04 |
| 2019/0372696 A1* | 12/2019 | Park | H04J 11/005 |
| 2019/0387488 A1* | 12/2019 | Wang | H04L 5/0051 |
| 2020/0186271 A1* | 6/2020 | Park | H04J 11/00 |

FOREIGN PATENT DOCUMENTS

| | | |
|---|---|---|
| CN | 106936756 A | 7/2017 |
| WO | 2017039372 A1 | 3/2017 |
| WO | 2017105338 A1 | 6/2017 |

OTHER PUBLICATIONS

3GPP TS 36.213 V14.3 0 (Jun. 2017),3rd Generation Partnership Project;Technical Specification Group Radio Access Network,Evolved Universal Terrestrial Radio Access (E-UTRA);Physical layer procedures(Release 14),total 460 pages.

3GPP TS 36.211 V14.3.0 (Jun. 2017),3rd Generation Partnership Project;Technical Specification Group Radio Access Network,Evolved Universal Terrestrial Radio Access (E-UTRA);Physical channels and modulation(Release 14),total 196 pages.

* cited by examiner

SIGNAL SENDING METHOD, SIGNAL RECEIVING METHOD, AND APPARATUS

CROSS-REFERENCE TO RELATED APPLICATIONS

This application is a continuation of International Application No. PCT/CN2017/096961, filed on Aug. 10, 2017. The disclosure of which is hereby incorporated by reference in its entirety.

TECHNICAL FIELD

This application relates to the field of wireless communications technologies, and in particular, to a signal sending method, a signal receiving method, and an apparatus.

BACKGROUND

The 3rd Generation Partnership Project (3GPP), as a mobile communications standardization organization, proposes a narrowband internet of things (NB-IoT) technology. A device that supports NB-IoT uses a frequency band with a bandwidth of 180 kHz during data transmission, and supports working in a standalone mode (Standalone operation), a guard-band mode (Guardband operation), or an in-band mode (In-band operation). The in-band mode means that one or more resource blocks on one carrier in a long term evolution (LTE) system are used to transmit NB-IoT service data, where a bandwidth of one resource block is 180 kHz. Similar to LTE, the NB-IoT technology is classified into time division duplex (TDD) NB-IoT and frequency division duplex (FDD) NB-IoT.

In the NB-IoT technology, a base station needs to broadcast a synchronization signal to notify a terminal device of some synchronization information, where the synchronization signal includes a narrowband primary synchronization signal (NPSS), a narrowband secondary synchronization signal (NSSS), a narrowband physical broadcast channel (NPBCH), a system information block 1-narrowband (SIB1-NB), or the like.

In the TDD NB-IoT, a synchronization signal needs to be broadcast by using a radio frame defined in a TDD LTE system. However, a downlink resource required by the synchronization signal in the TDD NB-IoT is poorly compatible with a downlink resource included in the radio frame in the TDD LTE system. Consequently, sending an NPSS, an NSSS, an NPBCH, and a SIB1-NB at a fixed period cannot be guaranteed. However, the NB-IoT technology is based on the LTE system, and therefore, the TDD NB-IoT needs to be compatible with the TDD LTE system. Therefore, in the TDD NB-IoT, how to send a synchronization signal is an urgent problem that needs to be resolved.

SUMMARY

An objective of implementations of this application is to provide a signal sending method, a signal receiving method, and an apparatus, so as to implement, in a TDD NB-IoT technology, sending or reception of a synchronization signal at a fixed period.

According to a first aspect, an embodiment of this application provides a signal sending method, including:

receiving, by a terminal device on a first carrier, a narrowband primary synchronization signal NPSS sent by a network device according to a first period, and a narrowband secondary synchronization signal NSSS sent by the network device according to a second period, where a subframe number of a subframe occupied by the NPSS in each period is M and a subframe number of a subframe occupied by the NSSS in each period is N, and M is 5 and N is 0 or M is 0 and N is 5;

receiving, by the terminal device on a second carrier, a narrowband physical broadcast channel NPBCH sent by the network device according to a third period and a system information block 1-narrowband SIB1-NB sent by the network device according to a fourth period, where a subframe number of a subframe occupied by the NPBCH in each period is P and a subframe number of a subframe occupied by the SIB1-NB in each period is Q, and P is 5 and Q is 0 or P is 0 and Q is 5; and completing, by the terminal device, downlink synchronization, and obtaining system information based on the NPSS, the NSSS, the NPBCH, and the SIB1-NB.

In the foregoing method, the NPSS and the NSSS that are received by the terminal are located on the first carrier, and the NPBCH and the SIB1-NB are located on the second carrier. Compared with an NPSS, an NSSS, an NPBCH, and a SIB1-NB that are sent by using a same carrier in FDD NB-IoT, a time interval between the NPSS and the NSSS in this embodiment of this application is different from a time interval between the NPSS and the NSSS in the FDD NB-IoT. Therefore, the terminal can distinguish, based on the time interval between the received NPSS and the received NSSS, whether a current cell is a TDD NB-IoT cell or an FDD NB-IoT cell, and then can accurately receive, on the second carrier, the NPBCH and the SIB1-NB. In addition, the terminal device can use only one receiver to receive the synchronization signal sent by the network device in this embodiment of this application and a synchronization signal in the FDD NB-IoT. In this way, costs of the terminal device are reduced.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

According to the foregoing method, the four Hadamard sequences in the Hadamard sequence set used in the NSSS are used without a need of additional indication information, to simply and efficiently indicate the frequency spacing between the first carrier and the second carrier.

According to a second aspect, an embodiment of this application provides a terminal device, where terminal device includes a memory, a transceiver, and a processor. The memory is configured to store an instruction. The processor is configured to control, by executing the instruction stored in the memory, the transceiver to receive and send a signal. When the processor executes the instruction stored in the memory, the terminal device is configured to perform the method in the first aspect or any possible design of the first aspect.

According to a third aspect, an embodiment of this application provides a terminal device, configured to implement the method in the first aspect or any possible design of the first aspect. The terminal device includes corresponding functional modules, for example, a processing unit, a transceiver unit, and a processing unit, respectively configured to implement the operations in the foregoing method.

According to a fourth aspect, an embodiment of this application provides a computer-readable storage medium, where the computer storage medium stores a computer-readable instruction, and when the computer-readable instruction is read and executed by a computer, the computer is enabled to perform the method in the first aspect or any possible design of the first aspect.

According to a fifth aspect, an embodiment of this application provides a computer program product, and when the computer program product is read and executed by a computer, the computer is enabled to perform the method in the first aspect or any possible design of the first aspect.

According to a sixth aspect, an embodiment of this application provides a chip, where the chip is connected to a memory, and is configured to read and execute a software program stored in the memory, to implement the method in the first aspect or any possible design of the first aspect.

According to a seventh aspect, an embodiment of this application provides a signal receiving method, including:

generating, by a network device, a narrowband primary synchronization signal NPSS and a narrowband secondary synchronization signal NSSS, and sending, on a first carrier, the NPSS according to a first period and sending, on the first carrier, the NSSS according to a second period, where a subframe number of a subframe occupied by the NPSS in each period is M and a subframe number of a subframe occupied by the NSSS in each period is N, and M is 5 and N is 0 or M is 0 and N is 5; and generating, by the network device, a narrowband physical broadcast channel NPBCH and a system information block 1-narrowband SIB1-NB, and sending, on a second carrier, the NPBCH according to a third period and sending, on the second carrier, the SIB1-NB according to a fourth period, where a subframe number of a subframe occupied by the NPBCH in each period is P and a subframe number of a subframe occupied by the SIB1-NB in each period is Q, and P is 5 and Q is 0 or P is 0 and Q is 5.

According to the foregoing method, the network device may simultaneously send the NPSS, the NSSS, the NPBCH, and the SIB1-NB by using the first carrier and the second carrier. In addition, because on the first carrier, the subframe number of the subframe occupied by the NPSS or the NSSS in each period is 5 or 0, and on the second carrier, the subframe number of the subframe occupied by the NPBCH or the SIB1-NB in each period is 5 or 0. Therefore, the NPSS, the NSSS, the NPBCH, and the SIB1-NB may be simultaneously sent by using a radio frame of any uplink and downlink configuration in a TDD LTE system, so that TDD NB-IoT and the TDD LTE system are compatible with each other to a greatest extent. In addition, a terminal device can use one receiver to receive synchronization signals in FDD NB-IoT and the TDD NB-IoT. In this way, costs of the terminal device are reduced and system efficiency is improved.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

According to an eighth aspect, an embodiment of this application provides a network device, where the network device includes a memory, a transceiver, and a processor. The memory is configured to store an instruction. The processor is configured to control, by executing the instruction stored in the memory, the transceiver to receive and send a signal. When the processor executes the instruction stored in the memory, the network device is configured to perform the method in the seventh aspect or any possible design of the seventh aspect.

According to a ninth aspect, an embodiment of this application provides a network device, configured to implement the method in the seventh aspect or any possible design of the seventh aspect. The network device includes corresponding functional modules, for example, a processing unit, a transceiver unit, and a processing unit, respectively configured to implement the operations in the foregoing method.

According to a tenth aspect, an embodiment of this application provides a computer-readable storage medium, where the computer storage medium stores a computer-readable instruction, and when the computer-readable instruction is read and executed by a computer, the computer is enabled to perform the method in the seventh aspect or any possible design of the seventh aspect.

According to an eleventh aspect, an embodiment of this application provides a computer program product, and when the computer program product is read and executed by a computer, the computer is enabled to perform the method in the seventh aspect or any possible design of the seventh aspect.

According to a twelfth aspect, an embodiment of this application provides a chip, where the chip is connected to a memory, and is configured to read and execute a software program stored in the memory, to implement the method in the seventh aspect or any possible design of the seventh aspect.

DESCRIPTION OF EMBODIMENTS

The following further describes in detail the embodiments of this application with reference to the accompanying drawings.

The embodiments of this application may be applied to various mobile communications systems, for example, a new radio (NR) system, a global system for mobile communications (GSM), a code division multiple access (CDMA) system, a wideband code division multiple access (WCDMA) system, a general packet radio service (GPRS), an LTE system, a long term evolution-advanced (LTE-A) system, a universal mobile telecommunications system (UMTS), an evolved long term evolution (eLTE) system, and other mobile communications systems.

Figure 1:
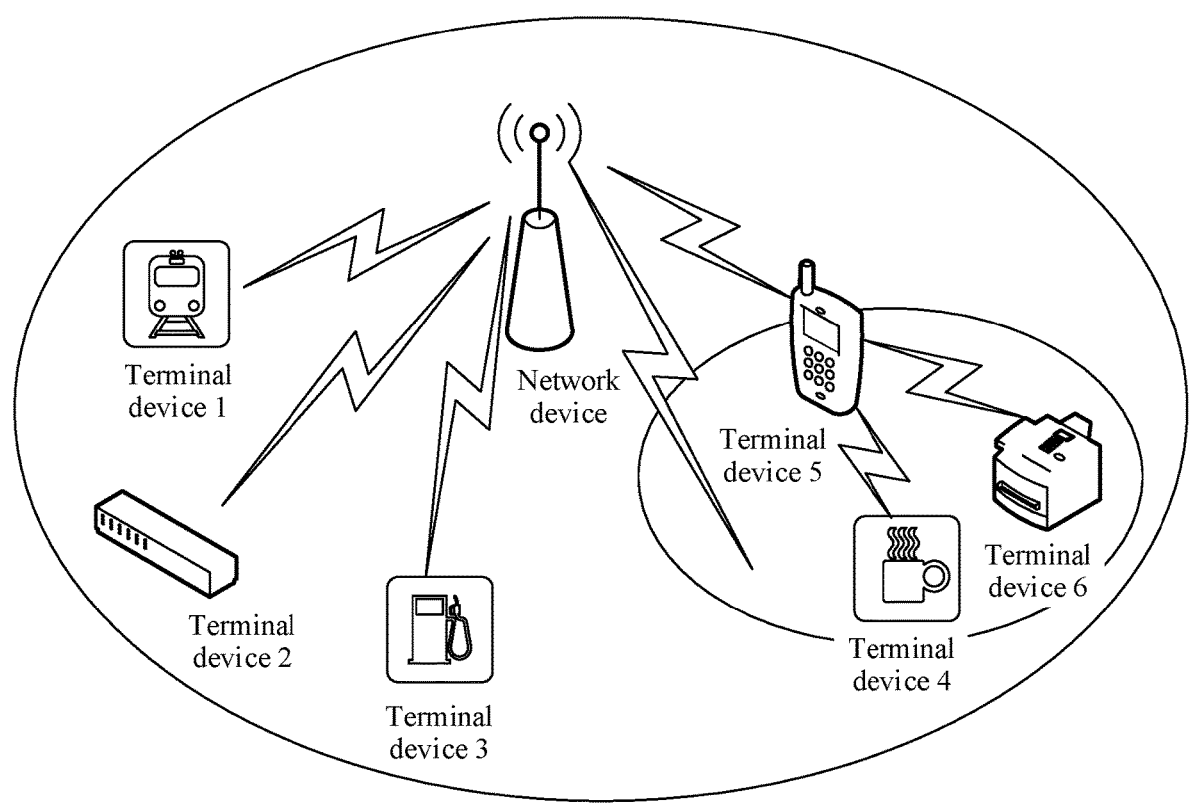
FIG. 1 is a schematic diagram of an example of a system architecture applicable to an embodiment of this application.

FIG. 1 is a schematic diagram of an example of a system architecture applicable to an embodiment of this application. As shown in FIG. 1, a network device and terminal devices 1 to 6 constitute a communications system. In the communications system, the network device sends information to one or more of the terminal devices 1 to 6. In addition, the terminal devices 4 to 6 also constitute a communications system. In the communications system, the terminal device 5 may send information to one or both of the terminal device 4 and the terminal device 6.

In this embodiment of this application, the terminal device may communicate with a core network via the network device. The terminal device may be user equipment (UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like.

The network device may be referred to as a radio access network (RAN) device, and is collectively referred to as a network device in the following. The network device is mainly responsible for providing a wireless connection for the terminal device, to ensure reliable transmission of uplink and downlink data of the terminal device. The network device may be a generation Node B (gNB) in a 5G system, a base transceiver station (BTS) in a global system for mobile communications (GSM) or a code division multiple access ( ), or a NodeB (NodeB, NB) in a wideband code division multiple access (WCDMA) system, or may be an evolved NodeB (Evolutional Node B, eNB, or eNodeB) in an LTE system.

In this embodiment of this application, a device (e.g., a network device or a terminal device) in NB-IoT may work in any one of a standalone mode, a guard-band mode, and an in-band mode. When working in any one of the foregoing modes, the network device may send a synchronization signal to the terminal device. When working in the standalone mode, the device in the NB-IoT may use one or more carriers in a GSM network to transmit NB-IoT service data, where a bandwidth of an independent carrier is 180 kHz.

Figure 2:
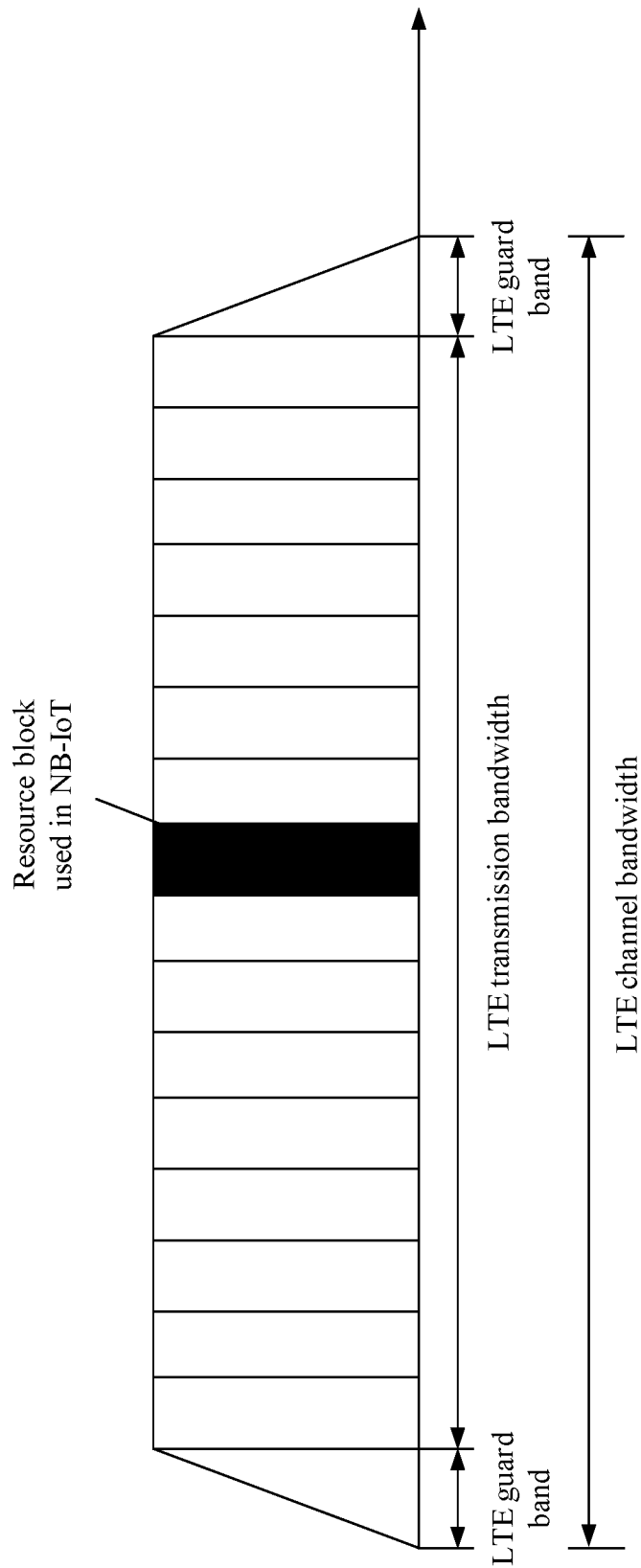
FIG. 2 is a schematic diagram of a bandwidth according to an embodiment of this application.

When working in the in-band mode, the device in NB-IoT may use one or more resource blocks on one carrier in an LTE system to transmit NB-IoT service data, where a bandwidth of one resource block is 180 kHz. Details may be shown in FIG. 2. In FIG. 2, one carrier in the LTE system may be divided into a plurality of resource blocks, a bandwidth of each resource block is 180 kHz, and the device in NB-IoT may use one or more of the plurality of resource blocks to transmit NB-IoT service data.

Figure 3:
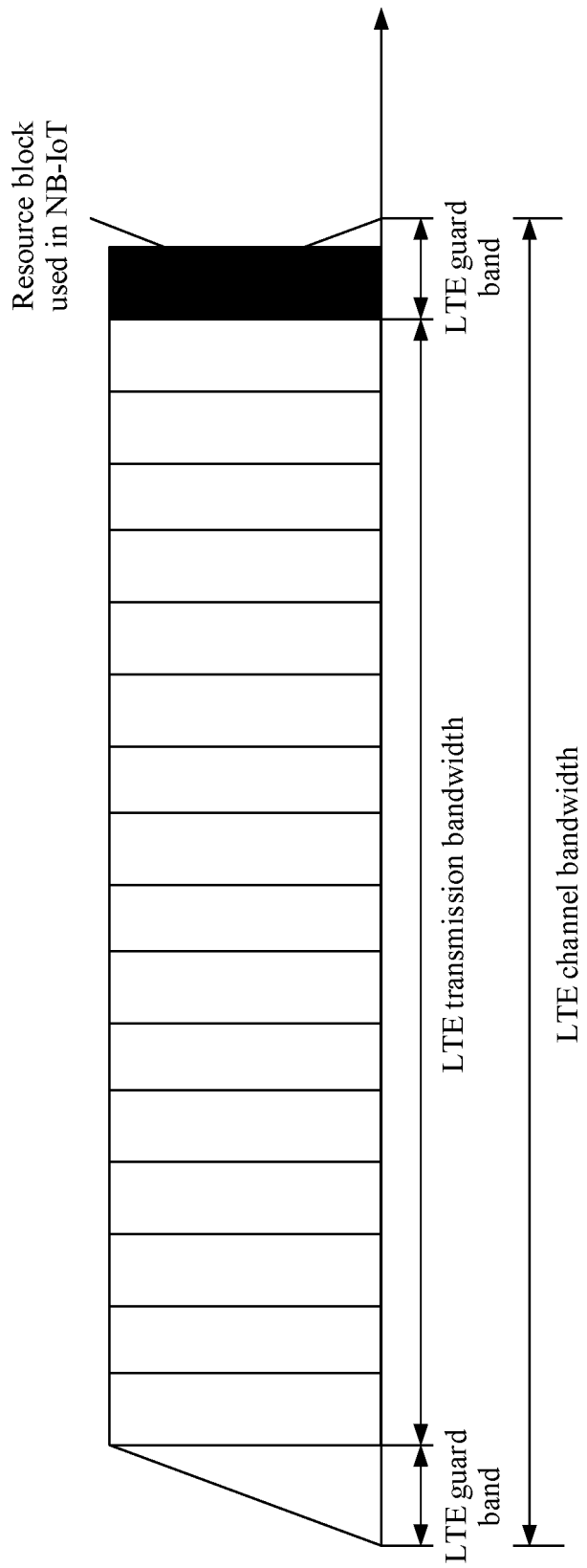
FIG. 3 is a schematic diagram of a bandwidth according to an embodiment of this application.

When working in the guard-band mode, the device in NB-IoT may use a guard band of a carrier in an LTE system to transmit NB-IoT service data, where a bandwidth occupied by the guard band is 180 kHz. Details may be shown in FIG. 3. In FIG. 3, the terminal device in NB-IoT may transmit NB-IoT service data by using a guard bandwidth of the carrier in the LTE system.

Figure 4:
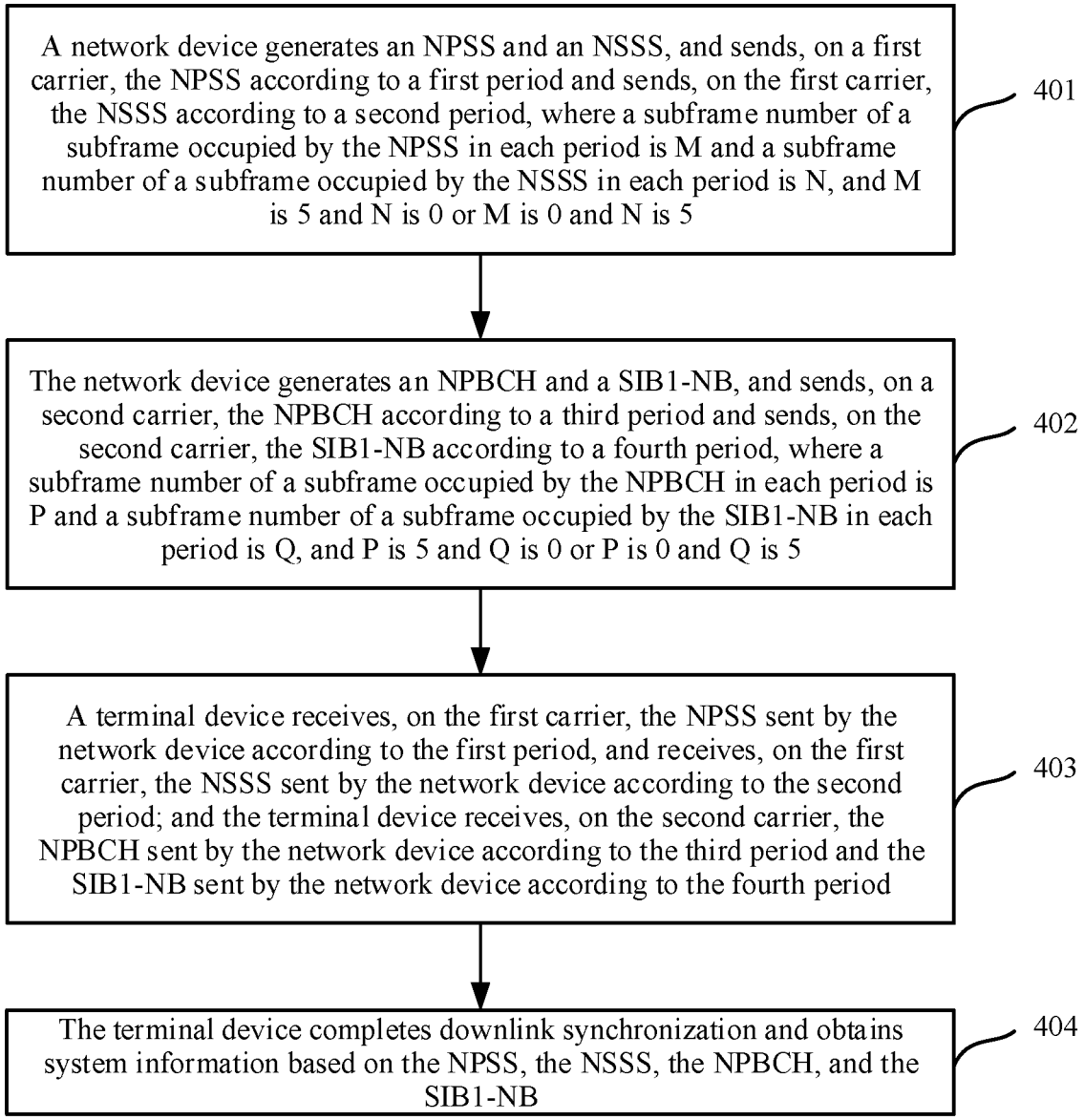
FIG. 4 is a schematic flowchart of a signal sending method according to an embodiment of this application.

With reference to the foregoing description, FIG. 4 is a schematic flowchart of a signal sending method according to an embodiment of this application. Referring to FIG. 4, the method includes the following operations.

Operation 401: A network device generates an NPSS and an NSSS, and sends, on a first carrier, the NPSS according to a first period and sends, on the first carrier, the NSSS according to a second period, where a subframe number of a subframe occupied by the NPSS in each period is M and a subframe number of a subframe occupied by the NSSS in each period is N, and M is 5 and N is 0 or M is 0 and N is 5.

Operation 402: The network device generates an NPBCH and a SIB1-NB, and sends, on a second carrier, the NPBCH according to a third period and sends, on the second carrier, the SIB1-NB according to a fourth period, where a subframe number of a subframe occupied by the NPBCH in each period is P and a subframe number of a subframe occupied by the SIB1-NB in each period is Q, and P is 5 and Q is 0 or P is 0 and Q is 5.

It should be noted that a sequence of operation 401 and operation 402 is not limited, and operation 401 and operation 402 may be performed simultaneously, or may be performed in any sequence.

Operation 403: A terminal device receives, on the first carrier, the NPSS sent by the network device according to the first period, and receives, on the first carrier, the NSSS sent by the network device according to the second period; and the terminal device receives, on the second carrier, the NPBCH sent by the network device according to the third period and the SIB1-NB sent by the network device according to the fourth period.

It should be noted that, in operation 403, a sequence of receiving the NPSS and the NSSS on the first carrier by the terminal device and receiving the NPBCH and the SIB1-NB on the second carrier by the terminal device is not limited. The terminal device may receive the foregoing signals on the first carrier and the second carrier simultaneously, or may receive the foregoing signals on the first carrier and the second carrier in any sequence.

It should be noted that both bandwidths of the first carrier and the second carrier are 180 kHz.

Operation 404: The terminal device completes downlink synchronization and obtains system information based on the NPSS, the NSSS, the NPBCH, and the SIB1-NB.

In operation 401, NPSS indication information may include an identifier (Physical-layer Identification) in a physical cell group on the network device, and a 5-ms timing (timing) of a physical cell. NSSS indication information may include a physical cell group identifier (Physical-layer cell-Identification group) on the network device, a cyclic prefix configuration (a normal cyclic prefix or an extended cyclic prefix), and a system frame timing (to be specific, a location of a subframe 0 in a system frame). Certainly, the foregoing is only an example. The NPSS and the NSSS may further indicate other information, and details are not described herein.

In this embodiment of this application, the first period for sending the NPSS may be a time length of one radio frame, that is, 10 ms, and the NPSS is sent only once in each first period. The NPSS may be sent in a subframe whose subframe number is 0 or 5 of each radio frame, and occupies the last 11 orthogonal frequency division multiplexing (OFDM) symbols of the subframe.

Correspondingly, the second period for sending the NSSS may be a time length of two radio frames, that is, 20 ms, and the NSSS is sent only once in each second period. The NPSS may be sent in a subframe whose subframe number is 0 or 5 of each radio frame, and occupies the last 11 OFDM symbols of the subframe. In each second period, an SFN of a radio frame for sending the NSSS may be an even number.

For specific transmission rules of the NPSS and the NSSS, refer to descriptions in an existing standard, and details are not described herein.

It should be noted that, the NPSS and the NSSS cannot occupy one subframe simultaneously, and need to be separately sent in two subframes. Therefore, when the NPSS and the NSSS are sent in a same radio frame, and when the subframe number of the subframe occupied by the NPSS is 5, the subframe number of the subframe occupied by the NSSS is 0. Correspondingly, when the subframe number of the subframe occupied by the NPSS is 0, the subframe number of the subframe occupied by the NSSS is 5.

In operation 402, NPBCH indication information may include a downlink system bandwidth, a system frame number (SFN), antenna configuration information, and the like. SIB1-NB indication information may include a cell global identifier, a cell barring status, a cell selection parameter, a transmission period of system information (SI), and the like.

Certainly, the foregoing is only an example. The NPBCH and the SIB1-NB may further indicate other information, and details are not described herein.

In this embodiment of this application, the third period for sending the NPBCH may be a time length of one radio frame, that is, 10 ms, and the NPBCH is sent only once in each third period. The NPBCH may be sent in a subframe whose subframe number is 0 or 5 of each radio frame, and occupies the last 11 OFDM symbols of the subframe.

Correspondingly, the fourth period for sending the SIB1-NB may be 2560 ms. In each fourth period, the SIB1-NB is sent for N times in 2N consecutive radio frames, and the SIB1-NB is sent once in every two radio frames, where N is a positive integer greater than 0. The SIB1-NB may be sent in a subframe whose subframe number is 0 or 5 of each radio frame, and occupies all OFDM symbols of the subframe.

For specific transmission rules of the NPBCH and the SIB1-NB, refer to descriptions in an existing standard, and details are not described herein.

It should be noted that, the NPBCH and the SIB1-NB cannot occupy one subframe simultaneously, and need to be separately sent in two subframes. Therefore, when the NPBCH and the SIB1-NB are sent in a same radio frame, and when the subframe number of the subframe occupied by the NPBCH is 5, the subframe number of the subframe occupied by the SIB1-NB is 0. Correspondingly, when the subframe number of the subframe occupied by the NPBCH is 0, the subframe number of the subframe occupied by the SIB1-NB is 5.

Figure 5:
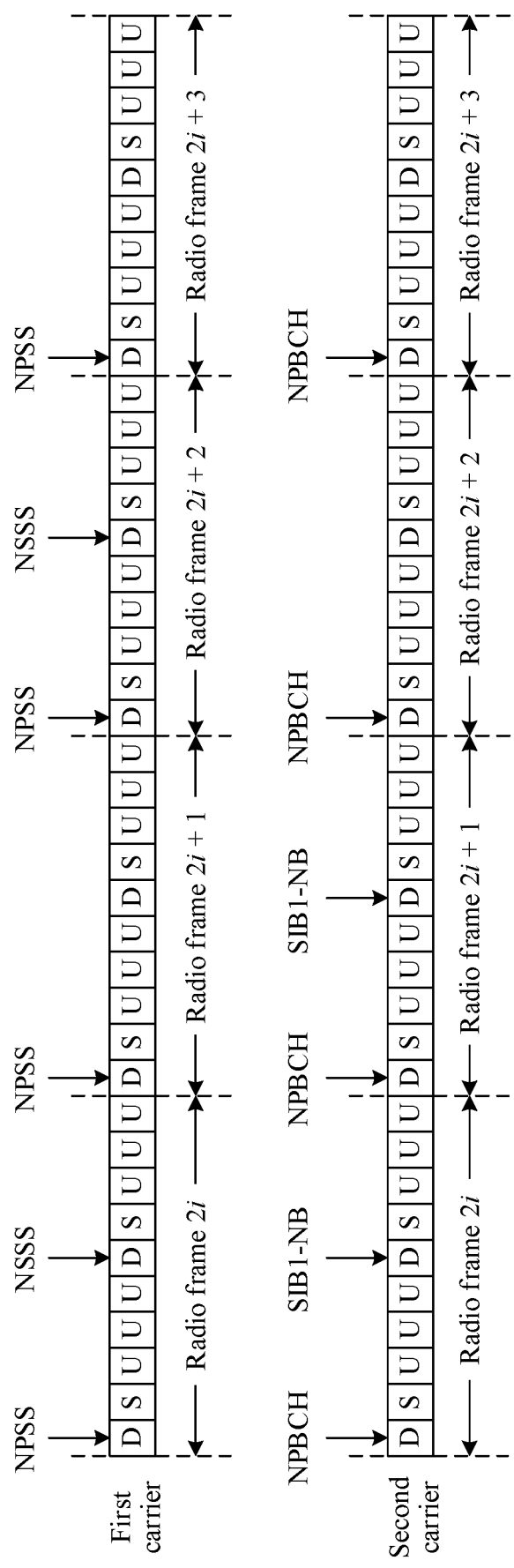
FIG. 5 is a schematic diagram of synchronization signal sending according to an embodiment of this application.

With reference to operation 401 and operation 402, the subframes occupied by the NPSS, the NSSS, the NPBCH, and the SIB1-NB that are sent by the network device may be shown in FIG. 5. In FIG. 5, one radio frame includes 10 subframes, and the subframes in each radio frame are respectively numbered 0 to 9 in a sending sequence. A subframe used to transmit a downlink signal is a downlink subframe, and is represented by D. A subframe used to transmit an uplink signal is an uplink subframe, and is represented by U. The downlink subframe and the uplink subframe are separated by using a special subframe, and the special subframe is represented by S.

In FIG. 5, the network device sends the NPSS and the NSSS on the first carrier. The NPSS is sent once at an interval of 10 ms, and the NSSS is sent once at an interval of 20 ms. SFNs of radio frames for sending the NSSS are 2i, 2i+2, and the like, where i is a non-negative integer.

In FIG. 5, the network device sends the NPBCH and the SIB1-NB on the second carrier. The NPBCH is sent once at an interval of 10 ms, and the SIB1-NB is sent once at an interval of 20 ms in 2N consecutive radio frames in every period of 2560 ms.

Certainly, the foregoing is only an example. There may be a plurality of cases of how the network device specifically sends the NPSS, the NSSS, the NPBCH, and the SIB1-NB, and examples are not described one by one herein.

According to the foregoing method, the network device may simultaneously send the NPSS, the NSSS, the NPBCH, and the SIB1-NB by using the first carrier and the second carrier. In addition, because on the first carrier, the subframe number of the subframe occupied by the NPSS or the NSSS in each period is 5 or 0, and on the second carrier, the subframe number of the subframe occupied by the NPBCH or the SIB1-NB in each period is 5 or 0. Therefore, the NPSS, the NSSS, the NPBCH, and the SIB1-NB may be sent by using a radio frame of any uplink-downlink configuration (Uplink-downlink configuration) in a TDD LTE system, so that TDD NB-IoT and the TDD LTE system are compatible with each other to a greatest extent. In addition, the terminal device can use one receiver to receive synchronization signals in FDD NB-IoT and the TDD NB-IoT. In this way, costs of the terminal device are reduced and system efficiency is improved.

Operation 402: The network device generates an NPBCH and a SIB1-NB, and sends, on a second carrier, the NPBCH according to a third period and sends, on the second carrier, the SIB1-NB according to a fourth period, where a subframe number of a subframe occupied by the NPBCH in each period is P and a subframe number of a subframe occupied by the SIB1-NB in each period is Q, and P is 5 and Q is 0 or P is 0 and Q is 5.

In this embodiment of this application, the first carrier used for the network device to send the NPSS and the NSSS may be a carrier that is pre-agreed on by the network device and the terminal device, and the second carrier used to send the NPBCH and the SIB1-NB may be a carrier that has an association relationship with the first carrier.

In a possible scenario, the association relationship between the first carrier and the second carrier is that: A frequency spacing between the first carrier and the second carrier is a preset frequency spacing. It should be noted that the frequency spacing between the first carrier and the second carrier herein may be a frequency spacing between a center frequency of the first carrier and a center frequency of the second carrier.

In this scenario, in operation 403, after determining the first carrier, the terminal device may determine the second carrier based on a frequency of the first carrier and the preset frequency spacing, so as to receive the NPBCH and the SIB1-NB on the second carrier.

In a possible scenario, a Hadamard (Hadamard) sequence set used in the NSSS may be used to indicate the frequency spacing between the first carrier and the second carrier. In this case, the frequency spacing between the first carrier and the second carrier may be a frequency spacing to which four Hadamard sequences included in the Hadamard sequence set used in the NS S S are mapped. The Hadamard sequence set used in the NSSS includes four Hadamard sequences, and the four Hadamard sequences are mapped to one frequency spacing. In this scenario, the four Hadamard sequences are mapped to one frequency spacing simultaneously. One frequency spacing can be indicated only when the Hadamard sequence set used in the NSSS simultaneously includes the four Hadamard sequences mapped to the frequency spacing.

The network device and the terminal device may pre-agree on the frequency spacing to which the four Hadamard sequences are mapped. After determining the frequency spacing between the first carrier and the second carrier, the network device generates, in the NSSS signal, the four Hadamard sequences mapped to the frequency spacing, and original four Hadamard sequences in the NSSS signal remain unchanged. In this case, the Hadamard sequence set used in the NSSS includes 8=4+4 Hadamard sequences. The terminal device may determine, based on the Hadamard sequences included in the Hadamard sequence set used in the NSSS, a frequency spacing to which four of the Hadamard sequences are mapped, so as to determine the second carrier.

In one embodiment, 4×Q Hadamard sequences are mapped to one frequency spacing simultaneously, where Q is a positive integer greater than 0. Before generating the NSSS, the network device may establish a mapping relationship between a frequency spacing and Hadamard sequences, where 4×Q Hadamard sequences are mapped to one frequency spacing simultaneously. One frequency spacing can be indicated only when the 4×Q Hadamard sequences simultaneously appear in the NSSS. After determining the frequency spacing between the first carrier and the second carrier, the network device generates, in the NSSS signal, the 4×Q Hadamard sequences mapped to the frequency spacing, and original four Hadamard sequences in the NSSS signal remain unchanged. In this case, the Hadamard sequence set used in the NSSS includes 4×Q+4 Hadamard sequences. The terminal device may determine the second carrier based on the frequency spacing to which the 4×Q Hadamard sequences are mapped.

For example, Q is equal to 2, and the network device may newly add eight Hadamard sequences on the basis of the original four Hadamard sequences in the NSSS. In this case, the NSSS includes 12 Hadamard sequences. The eight newly-added Hadamard sequences in the NSSS are orthogonal to the original four Hadamard sequences in the NSSS. After determining the frequency spacing between the first carrier and the second carrier, the network device generates, in the NSSS, the eight Hadamard sequences mapped to the frequency spacing, and the original four Hadamard sequences in the NSSS remain unchanged. In this case, the network device may indicate the frequency spacing between the first carrier and the second carrier to the terminal device by using the eight newly-added Hadamard sequences in the NSSS. In this case, in operation 403, after determining the first carrier, the terminal device determines, based on the NSSS received on the first carrier, the eight newly-added Hadamard sequences included in the Hadamard sequence set used in the NSSS, and then determines the frequency spacing between the first carrier and the second carrier based on the eight newly-added Hadamard sequences, so that the second carrier can be determined. Finally, the NPBCH and the SIB1-NB are received on the second carrier. When Q is equal to another value, refer to the foregoing description, and details are not described herein.

In operation 404, the synchronization information that can be determined by the terminal device based on the received NPSS, the received NSSS, the received NPBCH, and the received SIB1-NB includes but is not limited to: an identifier in a physical cell group on the network device, a 5-ms timing of a physical cell, a physical cell group identifier on the network device, a cyclic prefix configuration, a system frame timing, a downlink system bandwidth, a system frame number, antenna configuration information, a cell global identifier, a cell barring status, a cell selection parameter, a transmission period of system information, and the like.

According to the foregoing method, a time interval between the NPSS and the NSSS that are sent by the network device in TDD NB-IoT is different from a time interval between the NPSS and the NSSS that are sent by the network device in FDD NB-IoT. In a downlink synchronization process, the terminal device may distinguish whether a current cell is a TDD NB-IoT cell or an FDD NB-IoT cell by detecting the time interval between the NPSS and the NSSS, so as to correctly receive the NPBCH and the SIB1-NB. The terminal device can use only one receiver to access the FDD NB-IoT and the TDD NB-IoT. In this way, costs of the terminal device are reduced.

Figure 6:
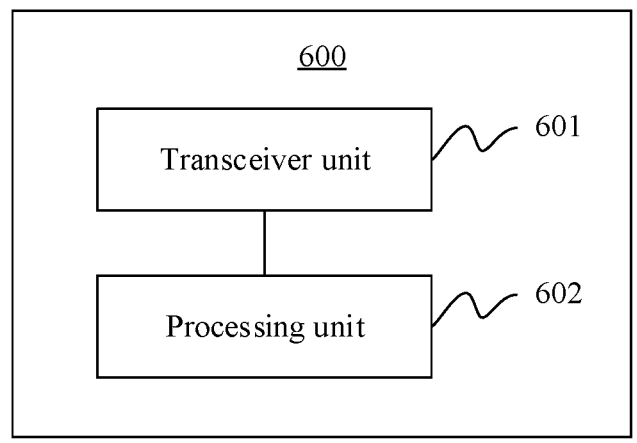
FIG. 6 is a schematic structural diagram of a terminal device according to an embodiment of this application.

FIG. 6 is a schematic structural diagram of a terminal device according to an embodiment of this application. The terminal device may be configured to perform actions of the terminal device in the foregoing method embodiments. The terminal device 600 includes a transceiver unit 601 and a processing unit 602.

The transceiver unit 601 is configured to receive, on a first carrier, a narrowband primary synchronization signal NPSS sent by a network device according to a first period and a narrowband secondary synchronization signal NSSS sent by the network device according to a second period, where a subframe number of a subframe occupied by the NPSS in each period is M and a subframe number of a subframe occupied by the NSSS in each period is N, and M is 5 and N is 0 or M is 0 and Nis 5.

The transceiver unit 601 is configured to receive, on a second carrier, a narrowband physical broadcast channel NPBCH sent by the network device according to a third period and a system information block 1-narrowband SIB1-NB sent by the network device according to a fourth period, where a subframe number of a subframe occupied by the NPBCH in each period is P and a subframe number of a subframe occupied by the SIB1-NB in each period is Q, and P is 5 and Q is 0 or P is 0 and Q is 5.

The processing unit 602 is configured to complete downlink synchronization and obtain system information based on the NPSS, the NSSS, the NPBCH, and the SIB1-NB that are received by the transceiver unit 601.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

Figure 7:
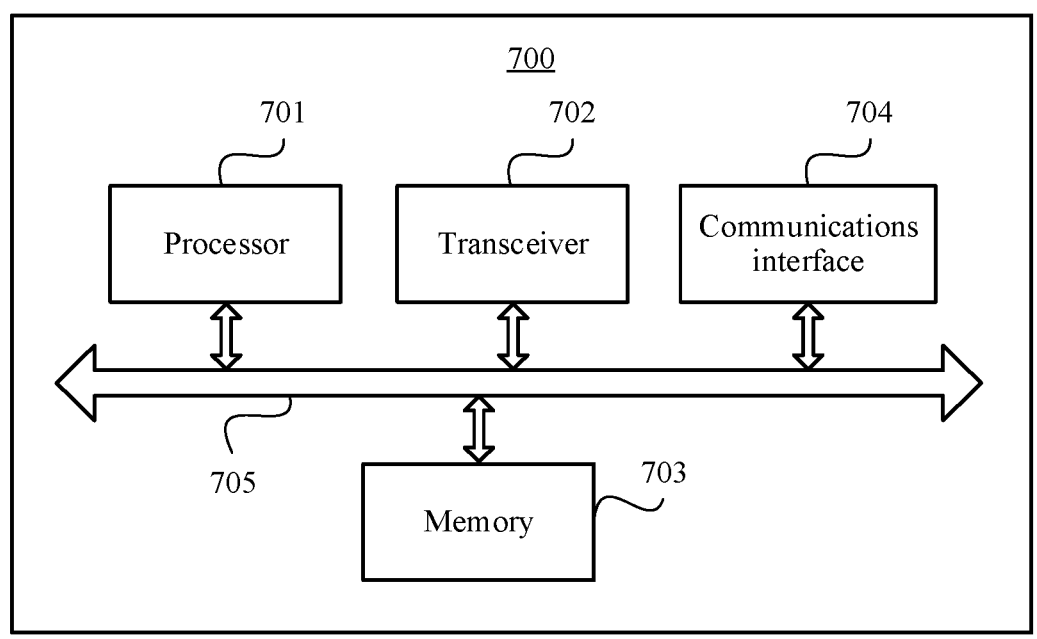
FIG. 7 is a schematic structural diagram of a terminal device according to an embodiment of this application.

FIG. 7 is a schematic structural diagram of a terminal device according to an embodiment of this application. The terminal device may be configured to perform actions of the terminal device in the foregoing method embodiments. The terminal device 700 includes a processor 701, a transceiver 702, a memory 703, and a communications interface 704. The processor 701, the transceiver 702, the memory 703, and the communications interface 704 are connected to each other by using a bus 705.

The processor 701 may be a central processing unit (CPU), a network processor (NP), or a combination of a CPU and an NP. The processor 701 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory 703 may include a volatile memory (volatile memory), for example, a random-access memory (RAM), or may include a non-volatile memory (non-volatile memory), for example, a flash memory (flash memory), a hard disk (HDD), or a solid-state drive (SSD). Alternatively, the memory 703 may include a combination of the foregoing types of memories.

The communications interface 704 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The bus 705 may be a peripheral component interconnect (PCI) bus, an extended industry standard architecture (EISA) bus, or the like. The bus may be classified into an address bus, a data bus, a control bus, and the like. For ease of representation, only one double-headed arrow is used to represent the bus in FIG. 7, but this does not mean that there is only one bus or only one type of bus.

The memory 703 may be configured to store a program instruction. The processor 701 invokes the program instruction stored in the memory 703, to perform one or more operations or an optional implementation in the embodiments shown in the foregoing solutions. In this way, an access network node 700 implements the functions in the foregoing methods.

The transceiver 702 is configured to receive, on a first carrier, a narrowband primary synchronization signal NPSS sent by a network device according to a first period and a narrowband secondary synchronization signal NSSS sent by the network device according to a second period, where a subframe number of a subframe occupied by the NPSS in each period is M and a subframe number of a subframe occupied by the NSSS in each period is N, and M is 5 and N is 0 or M is 0 and N is 5.

The transceiver 702 is configured to receive, on a second carrier, a narrowband physical broadcast channel NPBCH sent by the network device according to a third period and a system information block 1-narrowband SIB1-NB sent by the network device according to a fourth period, where a subframe number of a subframe occupied by the NPBCH in each period is P and a subframe number of a subframe occupied by the SIB1-NB in each period is Q, and P is 5 and Q is 0 or P is 0 and Q is 5.

The processor 701 is configured to complete downlink synchronization and obtain system information based on the NPSS, the NSSS, the NPBCH, and the SIB1-NB that are received by the transceiver 702.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

Figure 8:
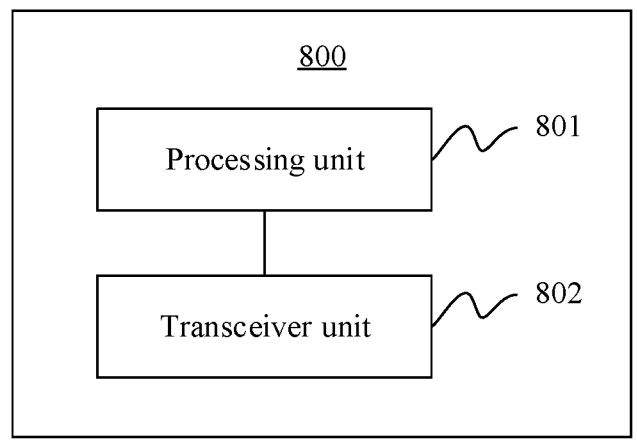
FIG. 8 is a schematic structural diagram of a network device according to an embodiment of this application.

FIG. 8 is a schematic structural diagram of a network device according to an embodiment of this application. The network device may be configured to perform actions of the network device in the foregoing method embodiments. The network device 800 includes a processing unit 801 and a transceiver unit 802.

The processing unit 801 is configured to generate a narrowband primary synchronization signal NPSS and a narrowband secondary synchronization signal NSSS.

The transceiver unit 802 is configured to send, on a first carrier according to a first period, the NPSS generated by the processing unit 801 and send, on the first carrier according to a second period, the NSSS generated by the processing unit 801, where a subframe number of a subframe occupied by the NPSS in each period is M and a subframe number of a subframe occupied by the NSSS in each period is N, and M is 5 and N is 0 or M is 0 and N is 5.

The processing unit 801 is configured to generate a narrowband physical broadcast channel NPBCH and a system information block 1-narrowband SIB1-NB.

The transceiver unit 802 is configured to send, on a second carrier according to a third period, the NPBCH generated by the processing unit 801, and send, on the second carrier according to a fourth period, the SIB1-NB generated by the processing unit 801, where a subframe number of a subframe occupied by the NPBCH in each period is P and a subframe number of a subframe occupied by the SIB1-NB in each period is Q, and P is 5 and Q is 0 or P is 0 and Q is 5.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

Figure 9:
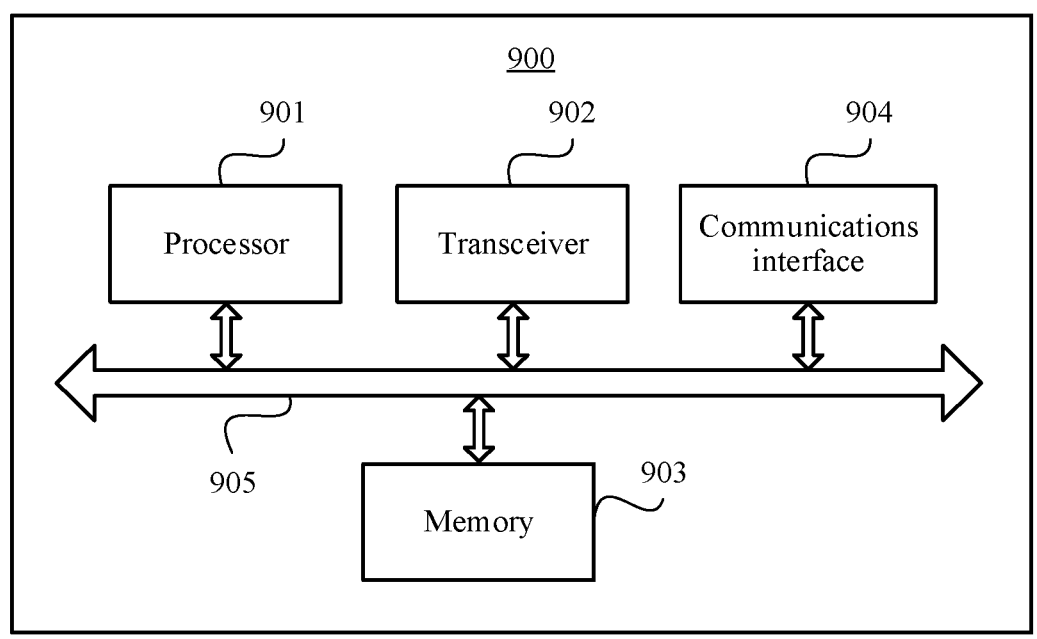
FIG. 9 is a schematic structural diagram of a network device according to an embodiment of this application.

FIG. 9 is a schematic structural diagram of a network device according to an embodiment of this application. The network device may be configured to perform actions of the network device in the foregoing method embodiments. The network device 900 includes a processor 901, a transceiver 902, a memory 903, and a communications interface 904. The processor 901, the transceiver 902, the memory 903, and the communications interface 904 are connected to each other by using a bus 905. For specific content of the foregoing modules, refer to descriptions of related modules in FIG. 7, and details are not described herein.

The processor 901 is configured to generate a narrowband primary synchronization signal NPSS and a narrowband secondary synchronization signal NSSS.

The transceiver 902 is configured to send, on a first carrier according to a first period, the NPSS generated by the processor 901 and send, on the first carrier according to a second period, the NSSS generated by the processor 901, where a subframe number of a subframe occupied by the NPSS in each period is M and a subframe number of a subframe occupied by the NSSS in each period is N, and M is 5 and N is 0 or M is 0 and N is 5.

The processor 901 is configured to generate a narrowband physical broadcast channel NPBCH and a system information block 1-narrowband SIB1-NB.

The transceiver 902 is configured to send, on a second carrier according to a third period, the NPBCH generated by the processor 901, and send, on the second carrier according to a fourth period, the SIB1-NB generated by the processor 901, where a subframe number of a subframe occupied by the NPBCH in each period is P and a subframe number of a subframe occupied by the SIB1-NB in each period is Q, and P is 5 and Q is 0 or P is 0 and Q is 5.

In one embodiment, a frequency spacing between the first carrier and the second carrier is a preset frequency spacing.

In one embodiment, a Hadamard sequence set used in the NSSS includes four Hadamard sequences, and the four Hadamard sequences are mapped to one frequency spacing; and a frequency spacing between the first carrier and the second carrier is the frequency spacing to which the four Hadamard sequences in the Hadamard sequence set used in the NSSS are mapped.

For related parts between the method embodiments of this application, reference may be made to each other. The apparatus provided in each apparatus embodiment is configured to perform the method provided in the corresponding method embodiment. Therefore, each apparatus embodiment may be understood with reference to a related part in a related method embodiment.

A person of ordinary skill in the art may understand that all or some of the operations of the method in the foregoing embodiments may be implemented by a program instructing related hardware. The program may be stored in a readable storage medium of a device such as a magnetic disk storage, or an optical memory. When the program is executed, all or some of the operations are performed.

In the foregoing specific implementations, the objective, the technical solutions, and the benefits of this application are described in further detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A signal receiving method, comprising:
   receiving, by a terminal device on a first carrier, a narrowband primary synchronization signal (NPSS) sent by a network device according to a first period and a narrowband secondary synchronization signal (NSSS) sent by the network device according to a second period, wherein a subframe number of a subframe occupied by the NPSS in each period is M and a subframe number of a subframe occupied by the NSSS in each period is N, and wherein M is 5 and N is 0 or M is 0 and N is 5, and wherein a Hadamard sequence set used in the NSSS comprises four Hadamard sequences that are mapped to a frequency spacing between the first carrier and a second carrier;
   receiving, by the terminal device on the second carrier, a narrowband physical broadcast channel (NPBCH) sent by the network device according to a third period and a system information block 1-narrowband (SIB1-NB) sent by the network device according to a fourth period, wherein a subframe number of a subframe occupied by the NPBCH in each period is P and a subframe number of a subframe occupied by the SIB1-NB in each period is Q, and wherein P is 5 and Q is 0 or P is 0 and Q is 5; and
   completing, by the terminal device, downlink synchronization and obtaining system information based on the NPSS, the NSSS, the NPBCH, and the SIB1-NB.

2. The signal receiving method according to claim 1, wherein the frequency spacing between the first carrier and the second carrier is a preset frequency spacing.

3. The signal receiving method according to claim 1, wherein the first carrier used by the network device to send the NPSS and the NSSS is a carrier that is pre-agreed on by the network device and the terminal device.

4. The signal receiving method according to claim 1, wherein the second carrier used to send the NPBCH and the SIB1-NB is a carrier that has an association relationship with the first carrier.

5. A signal transmitting method, comprising:
   generating, by a network device, a narrowband primary synchronization signal (NPSS) and a narrowband secondary synchronization signal (NSSS), and sending the NPSS according to a first period and the NSSS according to a second period on a first carrier to a terminal device, wherein a subframe number of a subframe occupied by the NPSS in each period is M and a subframe number of a subframe occupied by the NSSS in each period is N, and wherein M is 5 and N is 0 or M is 0 and N is 5, and wherein a Hadamard sequence set used in the NSSS comprises four Hadamard sequences that are mapped to a frequency spacing between the first carrier and a second carrier; and
   generating, by the network device, a narrowband physical broadcast channel (NPBCH) and a system information block 1-narrowband (SIB1-NB), and sending the NPBCH according to a third period and the SIB1-NB according to a fourth period on the second carrier to the terminal device, wherein a subframe number of a subframe occupied by the NPBCH in each period is P and a subframe number of a subframe occupied by the SIB1-NB in each period is Q, and wherein P is 5 and Q is 0 or P is 0 and Q is 5.

6. The signal transmitting method according to claim 5, wherein the frequency spacing between the first carrier and the second carrier is a preset frequency spacing.

7. The signal transmitting method according to claim 5, wherein the first carrier used by the network device to send the NPSS and the NSSS is a carrier that is pre-agreed on by the network device and the terminal device.

8. The signal transmitting method according to claim 5, wherein the second carrier used to send the NPBCH and the SIB1-NB is a carrier that has an association relationship with the first carrier.

9. A terminal device, comprising:
   a transceiver unit, configured to receive, on a first carrier, a narrowband primary synchronization signal (NPSS) sent by a network device according to a first period and a narrowband secondary synchronization signal (NSSS) sent by the network device according to a second period, wherein a subframe number of a subframe occupied by the NPSS in each period is M and a subframe number of a subframe occupied by the NSSS in each period is N, and wherein M is 5 and N is 0 or M is 0 and N is 5, and wherein a Hadamard sequence set used in the NSSS comprises four Hadamard sequences that are mapped to a frequency spacing between the first carrier and a second carrier;
   wherein the transceiver unit is configured to receive, on the second carrier, a narrowband physical broadcast channel (NPBCH) sent by the network device according to a third period and a system information block 1-narrowband (SIB1-NB) sent by the network device according to a fourth period, wherein a subframe number of a subframe occupied by the NPBCH in each period is P and a subframe number of a subframe occupied by the SIB1-NB in each period is Q, and wherein P is 5 and Q is 0 or P is 0 and Q is 5; and a processing unit, configured to complete downlink synchronization and obtain system information based on the NPSS, the NSSS, the NPBCH, and the SIB1-NB that are received by the transceiver unit.

10. The terminal device according to claim 9, wherein the frequency spacing between the first carrier and the second carrier is a preset frequency spacing.

11. The terminal device according to claim 9, wherein the first carrier used by the network device to send the NPSS and the NSSS is a carrier that is pre-agreed on by the network device and the terminal device.

12. The terminal device according to claim 9, wherein the second carrier used to send the NPBCH and the SIB1-NB is a carrier that has an association relationship with the first carrier.

* * * * *